US009956583B2

(12) United States Patent
Bregonzio

(10) Patent No.: US 9,956,583 B2
(45) Date of Patent: May 1, 2018

(54) METHOD AND DEVICE FOR APPLYING PROTECTIVE SHEETING OF POLYMER MATERIAL TO A PIPELINE

(75) Inventor: Valerio Bregonzio, San Giuliano Milanese (IT)

(73) Assignee: SAIPEM S.p.A., San Donato Milanese (IT)

( * ) Notice: Subject to any disclaimer, the term of this patent is extended or adjusted under 35 U.S.C. 154(b) by 448 days.

(21) Appl. No.: 14/126,360

(22) PCT Filed: May 31, 2012

(86) PCT No.: PCT/IB2012/052758
§ 371 (c)(1),
(2), (4) Date: Feb. 14, 2014

(87) PCT Pub. No.: WO2012/172451
PCT Pub. Date: Dec. 20, 2012

(65) Prior Publication Data
US 2014/0154409 A1  Jun. 5, 2014

(30) Foreign Application Priority Data

Jun. 17, 2011 (IT) .............................. MI2011A1104

(51) Int. Cl.
*B05D 1/26* (2006.01)
*B05C 5/02* (2006.01)
(Continued)

(52) U.S. Cl.
CPC ................ *B05D 1/265* (2013.01); *B05C 5/02* (2013.01); *B05C 9/12* (2013.01); *B29C 63/06* (2013.01);
(Continued)

(58) Field of Classification Search
None
See application file for complete search history.

(56) References Cited

U.S. PATENT DOCUMENTS 5,520,734 A * 5/1996 Taylor ................. B05B 13/0214
118/307
2010/0124593 A1* 5/2010 Robinson ............... A21C 15/02
426/275
(Continued)

FOREIGN PATENT DOCUMENTS

EP  1985909  10/2008
EP  1985909 A1 * 10/2008 ............... B05C 5/02
(Continued)

OTHER PUBLICATIONS

International Search Report and Written Opinion for International Application No. PCT/IB2012/052758 dated Sep. 26, 2012.
(Continued)

*Primary Examiner* — Jethro M Pence
(74) *Attorney, Agent, or Firm* — Neal, Gerber & Eisenberg LLP

(57) ABSTRACT

A method of applying protective sheeting of polymer material to a pipeline, the method including the steps of advancing a carriage along an annular path extending about the longitudinal axis of the pipeline; extruding the protective sheeting on the carriage; winding the protective sheeting, as the protective sheeting is extruded, about a cutback on the pipeline; and plastifying the polymer material on board the carriage.

12 Claims, 8 Drawing Sheets

(51) Int. Cl.
*B05C 9/12* (2006.01)
*B29C 63/06* (2006.01)
*F16L 13/02* (2006.01)
*F16L 58/10* (2006.01)
*F16L 58/18* (2006.01)
*B29C 47/00* (2006.01)
*B29C 47/08* (2006.01)

(52) U.S. Cl.
CPC ....... *F16L 13/0272* (2013.01); *F16L 58/1063* (2013.01); *F16L 58/181* (2013.01); *B29C 47/0002* (2013.01); *B29C 47/0009* (2013.01); *B29C 47/0866* (2013.01)

(56) References Cited

U.S. PATENT DOCUMENTS

2010/0133324 A1* 6/2010 Leiden ................ B29C 47/0866
228/176

2011/0259509 A1* 10/2011 Pirie ....................... B29C 63/14
156/187

FOREIGN PATENT DOCUMENTS

| JP | H05220739 | 8/1993 |
| WO | WO2005/063465 | 7/2005 |
| WO | WO 2008/071773 | 6/2008 |
| WO | WO 2008/107759 | 9/2008 |
| WO | WO 2010/049353 | 5/2010 |
| WO | WO 2011/033176 | 3/2011 |

OTHER PUBLICATIONS

Notification Concerning Submission, Obtention or Transmittal of Priority Document (Form PCT/IB/304) for International Application No. PCT/IB2012/052758 dated Sep. 12, 2012.
Notice of Opposition for European Application No. 12169896.3 dated Aug. 26, 2014.

* cited by examiner

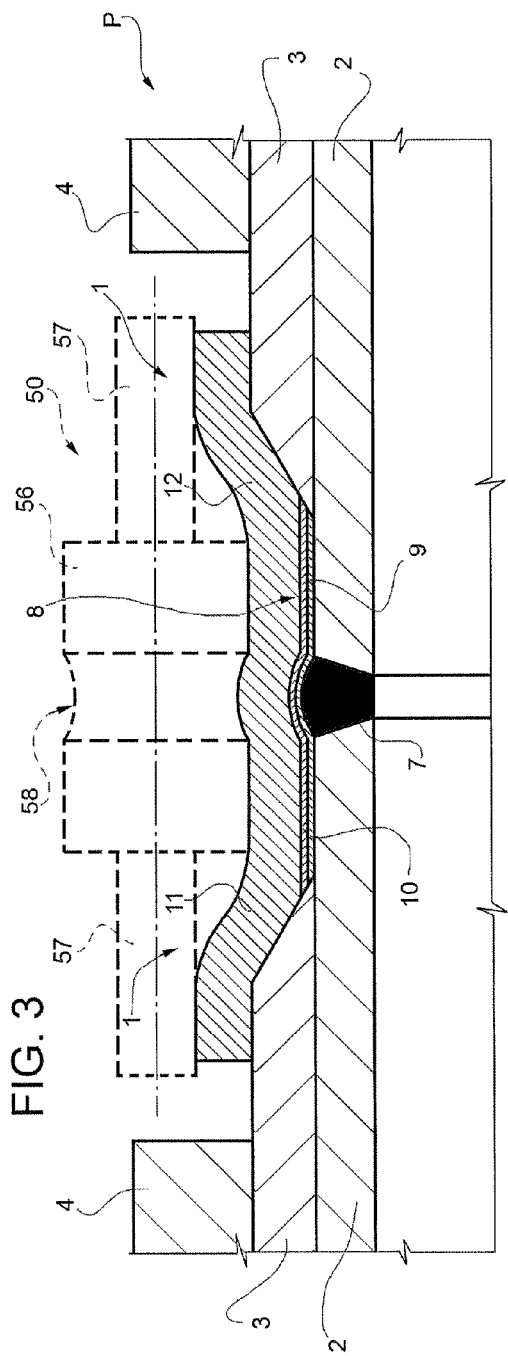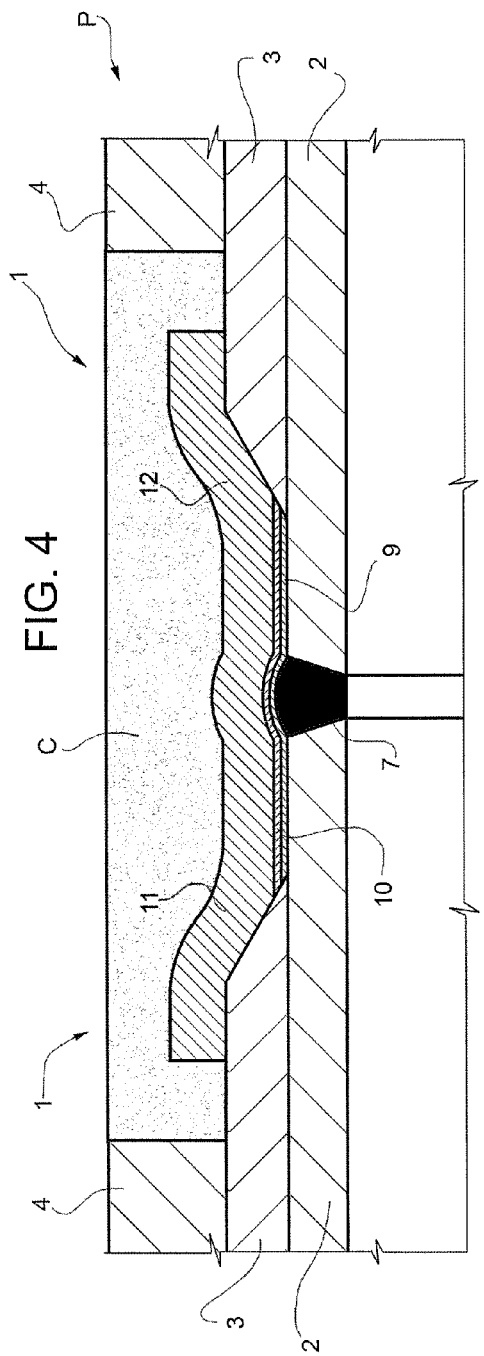

METHOD AND DEVICE FOR APPLYING PROTECTIVE SHEETING OF POLYMER MATERIAL TO A PIPELINE

PRIORITY CLAIM

This application is a national stage application of PCT/IB2012/052758, filed on May 31, 2012, which claims the benefit of and priority to Italian Patent Application No. MI2011A 001104, filed on Jun. 17, 2011, the entire contents of which are each incorporated by reference herein.

BACKGROUND

Pipelines are normally constructed by joining the free facing ends of two adjacent, longitudinally aligned pipe sections to form a cutback; and winding protective sheeting about the cutback. Pipelines are made of pipe sections joined to cover distances of hundreds of kilometers. Each pipe section is normally 12 meters (39 feet, 4.4375 inches) long, with a relatively large diameter ranging between 0.2 meters (7.875 inches) and 1.5 meters (4 feet, 11.0625 inches), and comprises a metal cylinder; a first coating of polymer material to protect the metal cylinder; and possibly a second coating of Gunite or concrete, which serves as ballast and is not always needed. To weld the metal cylinders together, the free opposite ends of each pipe section have no first or second coating; and the pipe sections are joined either at land-based installations or on board laying vessels configured to lay the pipeline as the pipeline is being built.

Joining the pipe sections comprises welding the metal cylinders, normally in a number or quantity of passes; and restoring the first and second coating (if any). Once an annular weld bead is formed between each two adjacent metal cylinders, the cutback extends astride the annular weld bead, along a bare portion with no first or second coating. In other words, the cutback is substantially defined by the free ends of the pipe sections, extends axially between two end portions of the first coating, and must be covered with a protecting coating to prevent corrosion.

Restoring the first coating along the cutback is known as 'field joint coating', and normally comprises coating the cutback with three coats of polymer material to protect and ensure adhesion of the coats to the metal cylinders. More specifically, restoring the first coating along the cutback comprises heating (e.g., induction heating), the cutback to a temperature of 250° C.; spraying the cutback with powdered epoxy resin (FBE—fusion bonded epoxy) which, in contact with the cutback, forms a relatively thin first coat or 'primer'; spraying the cutback, on top of the first coat, with a modified copolymer, which acts as adhesive and, in contact with the first coat, forms a relatively thin second coat; and applying a third so-called 'top coat', which also extends partly over the first coating. The second coating, if any, is then also restored.

Welding, non-destructive weld testing, and restoring the first and second coating are all performed at work stations equally spaced along the path of the pipe sections (or the pipeline being built, if the pipe sections are joined to this), so the pipe sections are advanced in steps and stopped for a given length of time at each work station.

One known method of applying the third coat to restore the first coating comprises extruding and simultaneously winding thick protective sheeting about the cutback, as described in the Applicant's PCT Patent Application No. WO 2008/071773, in European Patent Application No. EP 1,985,909, in PCT Patent Application No. WO 2010/049353 and in PCT Patent Application No. WO 2011/033176. In the methods described, the protective sheeting is applied by an extrusion port mounted on a carriage, which runs along an annular path about the longitudinal axis of the pipeline; and the polymer material is plastified by a plastifying device located close to the pipeline and either selectively connectable to or hose-connected to the extrusion head. Both methods of feeding the soft polymer material to the extrusion head have drawbacks, on account of the physical characteristics of the polymer material, which, to remain soft, must be heated to within a given temperature range.

SUMMARY

The present disclosure relates to a method of applying protective sheeting of polymer material to a pipeline, and in particular about a cutback on the pipeline.

The method according to one embodiment of the present disclosure forms part of a pipeline construction method, in particular for constructing underwater pipelines laid on the bed of a body of water.

It is an advantage of the present disclosure to provide a method of applying protective sheeting of polymer material to a cutback on a pipeline, configured to eliminate certain of the drawbacks of certain of the known art.

According to the present disclosure, there is provided a method of applying protective sheeting of polymer material to a pipeline, the method comprising the steps of advancing a carriage along an annular path extending about the longitudinal axis of the pipeline; extruding the protective sheeting on the carriage; winding the protective sheeting, as the protective sheeting is extruded, about a cutback on the pipeline; and plastifying the polymer material on board the carriage.

The method according to the present disclosure has the advantage of applying the protective sheeting at very high temperature, and therefore in a highly plastic state capable of adapting to uneven surfaces. Moreover, the polymer material is fed easily to the carriage in the solid state; and the relatively short distance travelled by the soft polymer material simplifies temperature and pressure control and reduces the amount of energy required to heat the polymer material.

In one embodiment of the disclosure, the method comprises storing the plastified polymer material on the carriage.

This solution frees the sheeting application stage, which is normally relatively fast, from the plastifying stage, which is normally relatively slow and related to the size and the heating power of the plastifying device. By storing the plastified polymer material on the carriage, the polymer material can be plastified during the downtime between applications.

In one embodiment of the disclosure, the method comprises advancing the pipeline, with respect to the carriage, in a direction parallel to the longitudinal axis of the pipeline to position the carriage at the next cutback; and the polymer material is conveniently plastified mainly as the pipeline advances with respect to the carriage (i.e., when the carriage is idle).

In one embodiment, the method comprises feeding the polymer material in the solid state to a feed port of a plastifying device on the carriage as the pipeline advances.

In one embodiment, the method comprises selectively securing the carriage in an axial direction to the pipeline; and advancing the carriage about the cutback with the carriage secured to the pipeline.

In one embodiment of the disclosure, the method comprises plastifying the polymer material and extruding the protective sheeting using a plastifying and extrusion assembly mounted on the carriage and comprising an extrusion head with an extrusion port. The plastifying and extrusion assembly is, in one embodiment a one-piece block, which is mounted adjustably on the carriage, and is, in one embodiment, connected to the carriage to permit remote control of the position of the block and adjust the distance between the extrusion port and the cutback as a function of the position of the carriage along the annular path.

In one embodiment of the disclosure, the method comprises pressing the protective sheeting onto the pipeline using a rolling assembly hinged to the carriage and comprising a roller; and adjusting the pressure exerted by the roller on the protective sheeting.

In one embodiment, the roller is powered to rotate about its axis; and the method comprises adjusting the rotation speed and reversing the rotation direction of the roller.

In certain embodiments, the roller plays a role in correctly restoring the first coating, and in preventing air bubbles forming between the protective sheeting and the cutback. Adjusting the pressure exerted by the roller enables pressure to be adapted to the physical condition of the protective sheeting; by adjusting the speed of the roller, rotation of the roller can be synchronized with the travelling speed of the carriage, to avoid shear stress as the roller rolls over the protective sheeting; and inverting the rotation direction of the roller enables the protective sheeting to be used even when the carriage is travelling in the opposite to application direction.

In one embodiment of the disclosure, the method comprises extruding an initial portion of the protective sheeting with the carriage stationary and so positioned that the initial portion of the protective sheeting is inserted by force of gravity between the pipeline and the roller; and gripping the initial portion between the roller and the pipeline.

In this way, the initial portion of the protective sheeting is clamped immediately to the pipeline by the roller, with sufficient pressure to prevent air bubbles forming.

In one embodiment, the method comprises advancing the carriage about the cutback when the initial portion of the protective sheeting is gripped between the pipeline and the roller.

So doing keeps the portion of the protective sheeting between the extrusion port and the roller taut, thus reducing the risk of air bubbles forming between the protective sheeting and the pipeline.

In one embodiment of the disclosure, the method comprises cutting the extruded protective sheeting at the extrusion port; and closing the extrusion port, such as using a blade.

So doing has the advantages of forming a neat, clean end of the protective sheeting, and preventing soft polymer material from dripping from the extrusion port.

In one embodiment of the disclosure, the method comprises adjusting the travelling speed of the carriage as a function of the position of the carriage along the annular path, to ensure optimum application of the protective sheeting.

Because the carriage makes at least one complete turn about the pipeline, and given the considerable weight and delicate nature of the soft protective sheeting, it is advisable to regulate the travelling speed of the carriage at least along the more critical points.

For the same reasons, it is also advisable to adjust the distance between the protective sheeting extrusion port and the pipeline as a function of the position of the carriage.

In one embodiment of the disclosure, the step of pressing the protective sheeting onto the pipeline using a rolling assembly comprises rolling the roller, directly downstream from the extrusion port, in a first rotation direction of the carriage when extruding the protective sheeting; and keeping the roller pressed onto the protective sheeting in a second rotation direction of the carriage opposite the first rotation direction.

This solution has the advantage of improving adhesion of the protective sheeting to the pipeline, and is made possible by rotation of the roller being reversible, and by the pressure of the roller being adjustable. That is, as the roller rolls in the first rotation direction of the carriage, the polymer sheeting has just been laid and is highly plastic. Whereas, as the roller rolls in the second rotation direction of the carriage, the roller encounters increasingly firmer, longer-laid portions of the protective sheeting, so the pressure of the roller is increased gradually as the roller rolls in the second rotation direction of the carriage.

It is a further advantage of the present disclosure to provide a device configured to apply protective sheeting of polymer material about a cutback on a pipeline, configured to eliminate certain of the drawbacks of certain of the known art.

According to the present disclosure, there is provided a device configured to apply protective sheeting of polymer material to a pipeline, the device comprising a carriage, which moves along an annular path extending about the longitudinal axis of the pipeline to apply the protective sheeting to a cutback on the pipeline; and a plastifying and extrusion assembly mounted on the carriage to plastify the polymer material from which the protective sheeting is made, and to extrude the protective sheeting on board the carriage.

In one embodiment, the plastifying and extrusion assembly is a one-piece block having a feed port for solid, such as granular, polymer material; and an extrusion port configured to apply the protective sheeting.

The soft polymer material thus travels a very short distance, and is therefore easily controllable.

In one embodiment of the disclosure, the device comprises a contoured roller, in turn comprising a central portion; two lateral portions smaller in diameter than the central portion; and a groove formed in the central portion to adapt the roller to the shape of a central weld bead on the cutback.

Additional features and advantages are described in, and will be apparent from the following Detailed Description and the figures.

BRIEF DESCRIPTION OF THE DRAWINGS

Various embodiments of the present disclosure will be described by way of example with reference to the accompanying drawings, in which:

FIGS. 3 and 4 show larger-scale sections, with parts removed for clarity, of pipe sections at various stages in the method according to the present disclosure;

DETAILED DESCRIPTION

Figure 1:
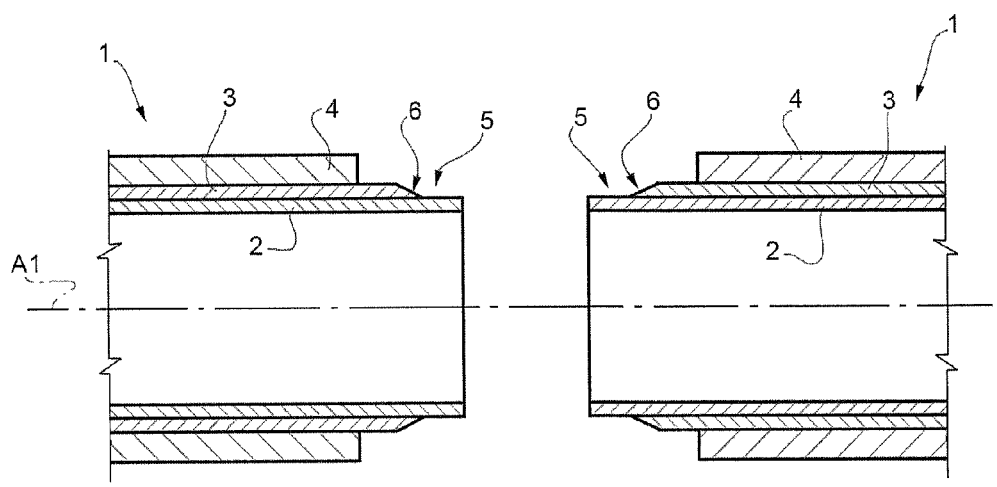
FIGS. 1 and 2 show sections, with parts removed for clarity, of pipe sections at various joining stages.

Referring now to the example embodiments of the present disclosure illustrated in FIGS. 1 to 14, numbers 1 in FIG. 1 indicate two pipe sections, each of which comprises a metal cylinder 2; a first coating 3 of polymer material, normally polyethylene or polypropylene, contacting and for corrosion proofing metal cylinder 2; and a second coating 4 of Gunite or concrete for ballast.

In an alternative embodiment (not shown), the pipe sections have no second coating.

Figure 2:
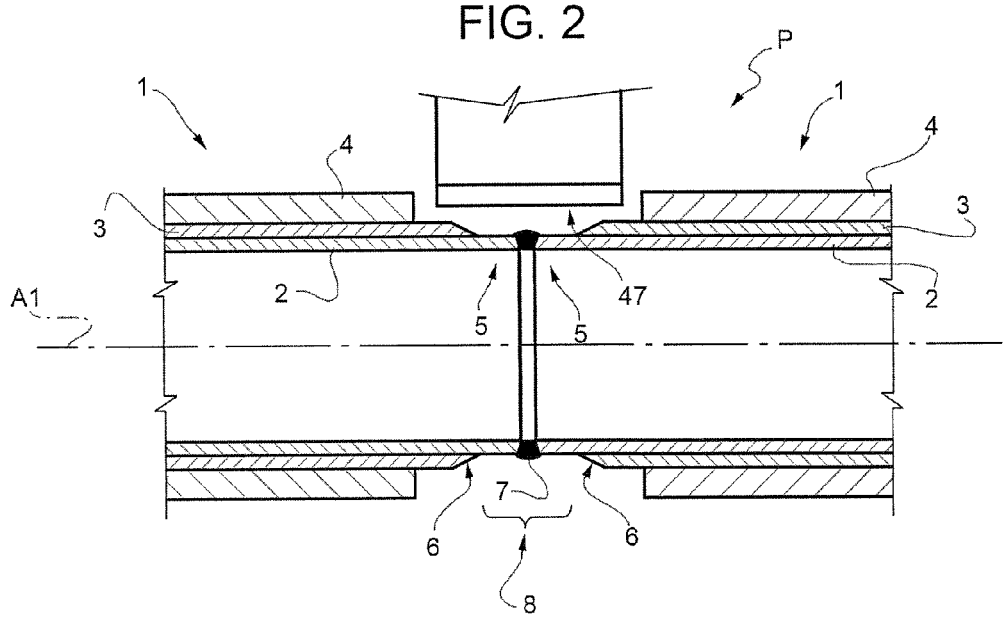

Each pipe section 1 has two opposite free ends 5 (only one shown in FIGS. 1 and 2) with no first coating 3 or second coating 4. First coating 3 has a bevel 6 at each free end 5. Two successive pipe sections 1, aligned along a longitudinal axis A1 (FIG. 1), are positioned with free ends 5 together, parallel and facing each other, and are welded, possibly in a number or quantity of passes at successive work stations, to form an annular weld bead 7 in between (FIG. 2). As shown in FIG. 2, the two welded pipe sections 1 form a cutback 8 extending along longitudinal axis A1, between bevels 6 on first coating 3, and along annular weld bead 7.

When joined, pipe sections 1 form a pipeline indicated generically by P, and which, in the present description, also includes the pipeline being constructed and formed, for example, by only two joined pipe sections 1.

In addition to welding metal cylinders 2, joining pipe sections 1 also comprises restoring first coating 3 and possibly also second coating 4. Restoring first coating 3 comprises grit-blasting the surface of cutback 8; induction heating cutback 8 to roughly 250° C.; and applying in rapid succession onto cutback 8 a first coat 9, a second coat 10, and a third coat 11 of polymer material (FIG. 3).

Figure 5:
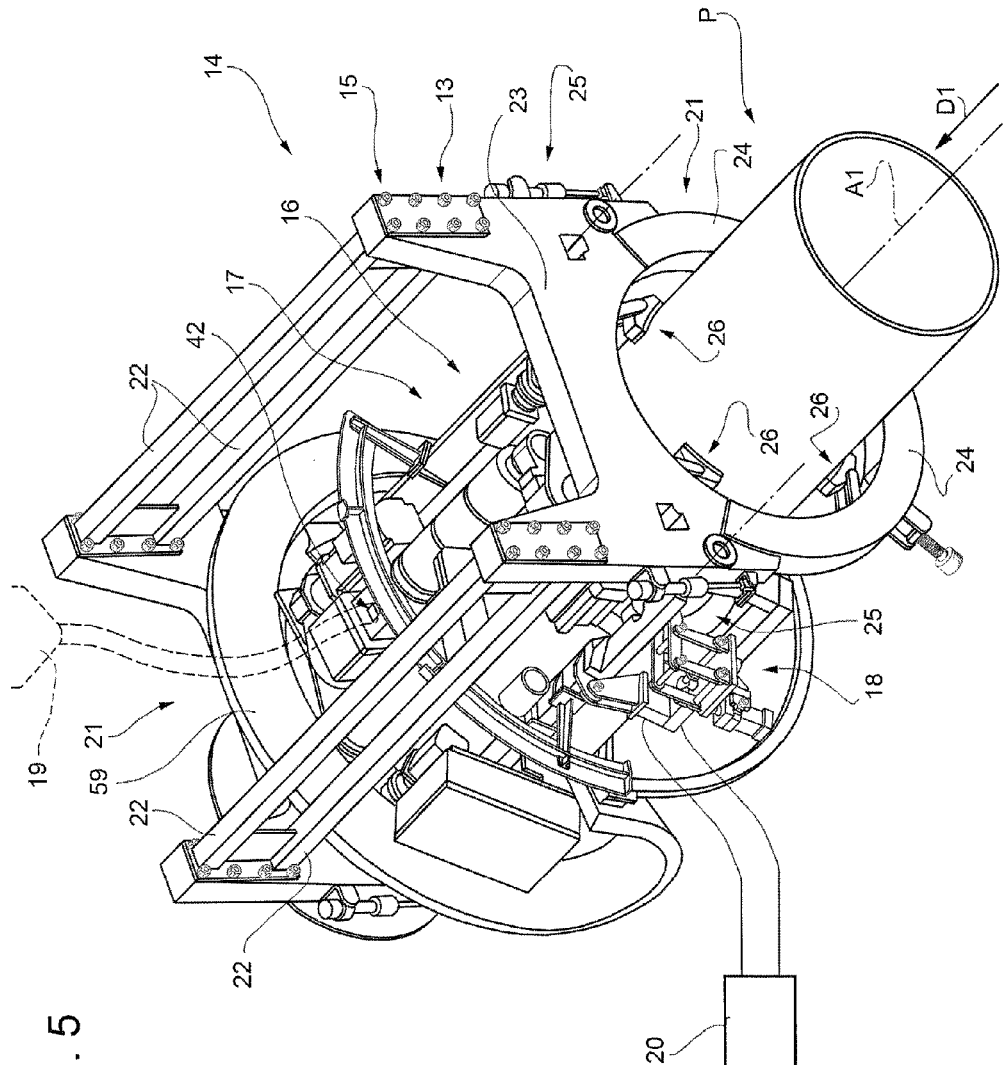
FIG. 5 shows a view in perspective, with parts removed for clarity, of the device configured to apply protective sheeting of polymer material according to the present disclosure.

As shown in FIG. 3, first coat 9 is a 100-500 micron thick coat of epoxy resin (FBE—fusion bonded epoxy) sprayed in powdered form onto cutback 8 using a spray gun (not shown). Second coat 10 is a 100-500 micron thick coat of modified copolymer, normally CMPE or CMPP, sprayed in powdered form on top of first coat 9 on cutback 8 using a spray gun (not shown). And third coat 11 is a 2-5 mm thick coat of polymer, such as polyolefin, CMPE or CMPP, applied by winding a single piece of protective sheeting 12 of polymer material about cutback 8 at a work station 13, as shown in FIG. 5. In the example shown, protective sheeting 12 is wound about cutback 8 at station 13 (FIG. 5), is wider than cutback 8 (measured along longitudinal axis A1—FIG. 2) so as to overlap first coatings 3 and bevels 6 of both joined pipe sections 1, and is long enough to wind completely about cutback 8 and overlap at the ends.

Protective sheeting 12 is actually extruded as the protective sheeting is wound about pipeline P.

With reference to FIG. 4, second coating 4 is restored with a coat of cement C.

Number 14 in FIG. 5 indicates a device configured to plastify the polymer material from which protective sheeting 12 is made, and configured to extrude and simultaneously wind protective sheeting 12 about pipeline P.

Constructing pipeline P, in particular on board a laying vessel (not shown), comprises feeding pipeline P in steps in a direction D1 parallel to longitudinal axis A1; and fixing device 14 to pipeline P at cutback 8. Device 14 is located at work station 13, and comprises a frame 15; a carriage 16 movable along frame 15; a plastifying and extrusion assembly 17 mounted on carriage 16; a rolling assembly 18 mounted on carriage 16; a hopper 19 configured to feed solid polymer material to plastifying and extrusion assembly 17; and a control unit 20 connected to carriage 16. Frame 15 comprises two facing grippers 21 spaced apart; and beams 22 for rigidly connecting grippers 21. Each gripper 21 is annular, and has one sector 23 and two sectors 24 complementary with one another to define a ring. Sectors 23 of grippers 21 are connected rigidly to one another by beams 22; and the two sectors 24 of each gripper 21 are hinged to corresponding sector 23 about hinge axes parallel to longitudinal axis A1, and are operated by actuators 25 to rotate from the closed position in FIG. 6 to an open position (not shown) to release device 14 from pipeline P. Sectors 23, 24 have adjustable spacers 26 facing and configured to be positioned contacting pipeline P, and which are adjusted accurately to centre frame 15 on pipeline P.

Figure 6:
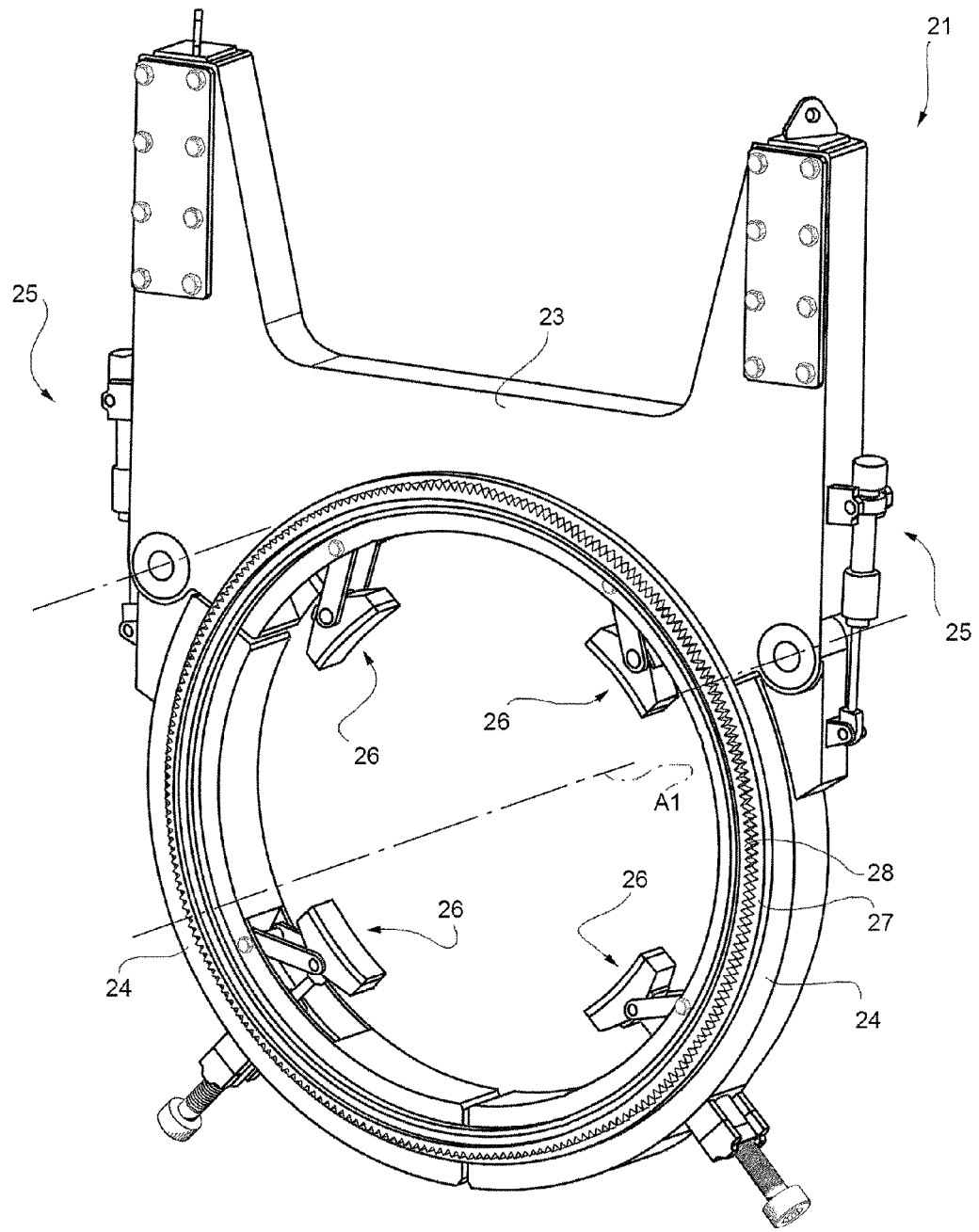
FIG. 6 shows a larger-scale side view, with parts removed for clarity, of a component part of the FIG. 5 device.

As shown in FIG. 6, in the closed position, sectors 23, 24 of each gripper 21 define a circular guide 27 for carriage 16 (FIG. 5); and a circular rack 28 which cooperates with carriage 16 (FIG. 5) to move carriage forward.

As shown in FIG. 5, frame 15 is configured to selectively connect device 14 to pipeline P; to centre guides 27 with respect to longitudinal axis A1 of pipeline P; and to support and guide carriage 16 along an annular path.

Figure 7:
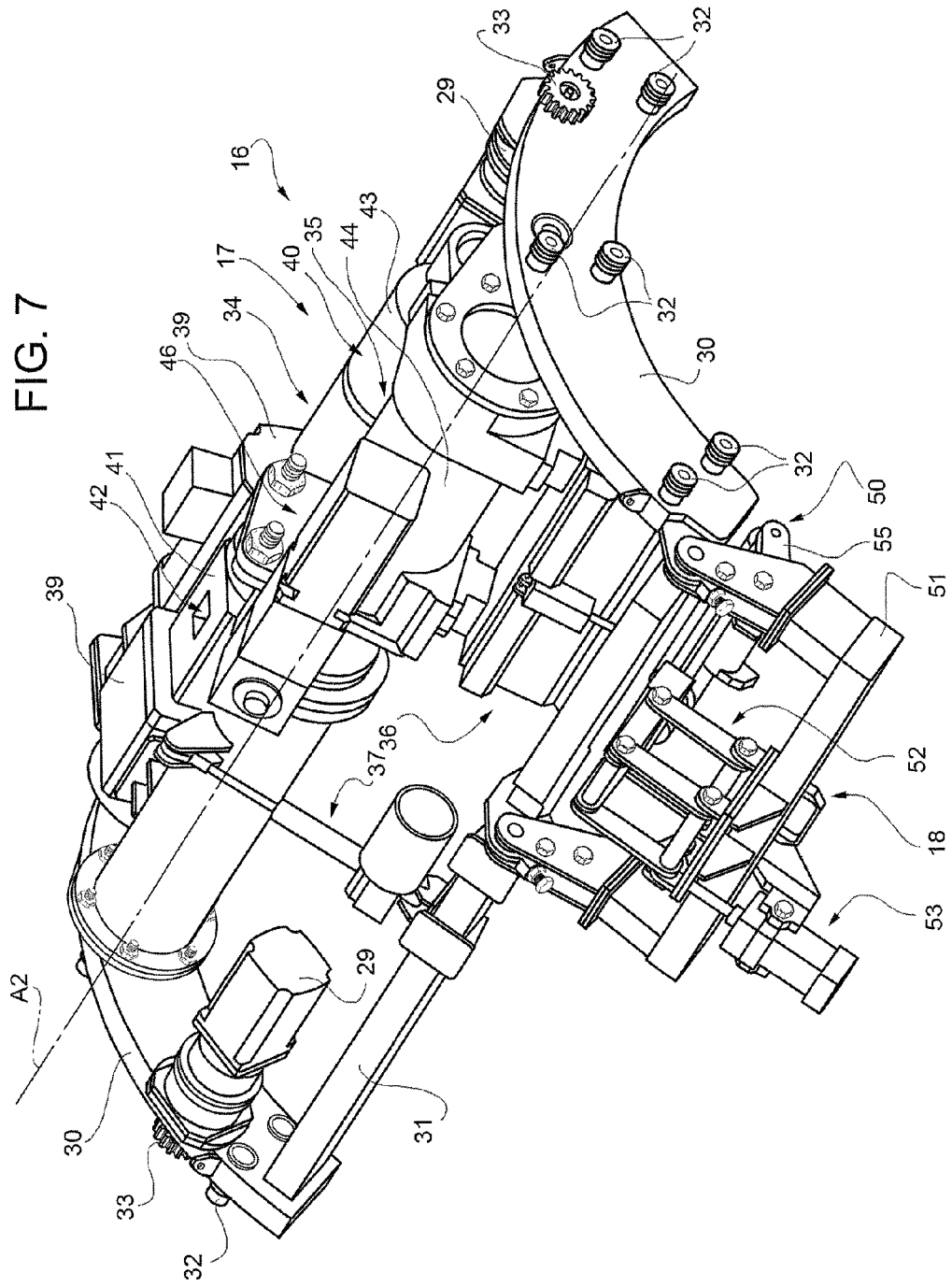
FIGS. 7 and 8 show larger-scale views in perspective, with parts removed for clarity, of a carriage of the FIG. 5 device.
Figure 8:
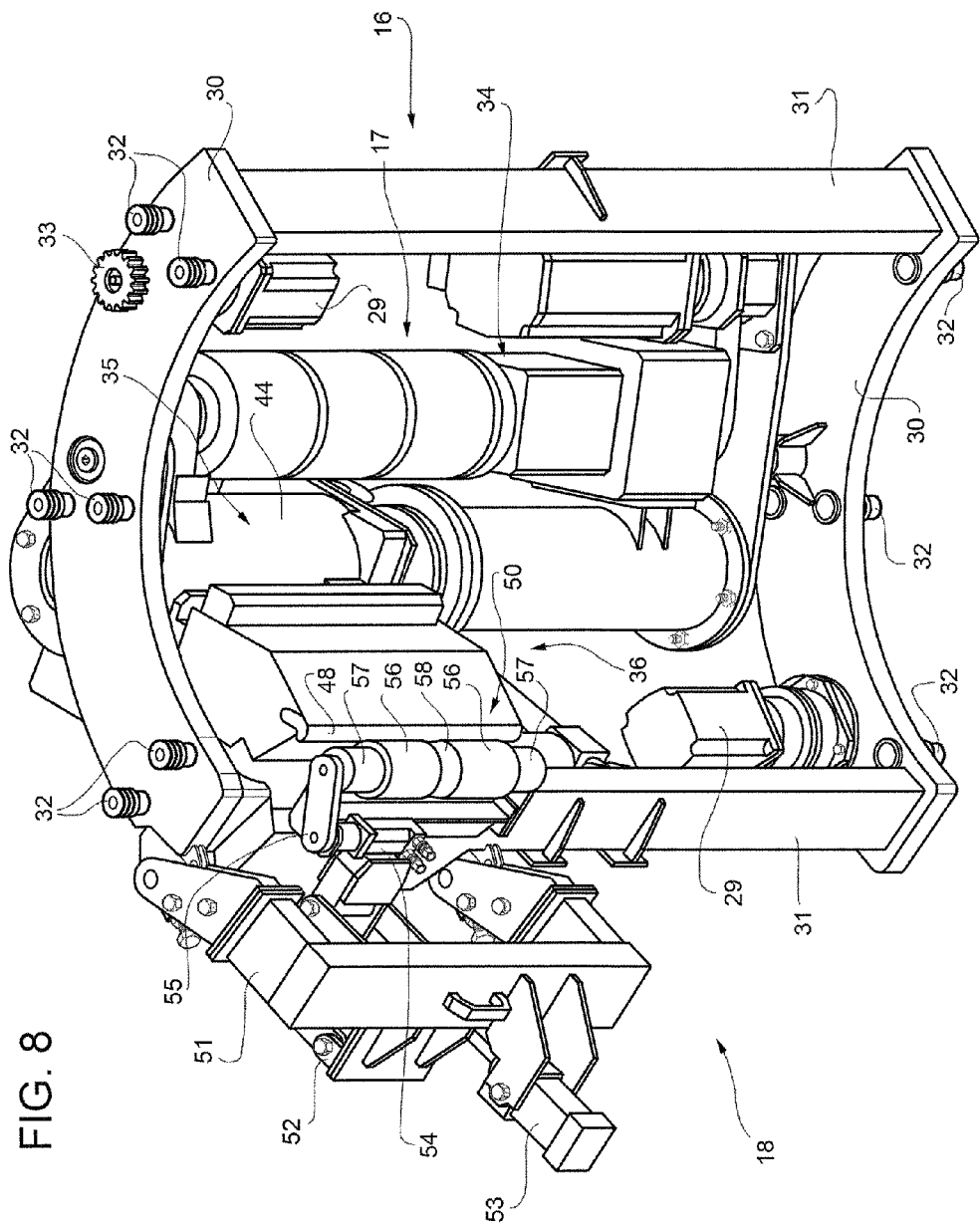

As shown in FIGS. 7 and 8, carriage 16 comprises two actuators 29 configured to move carriage 16 forward; two facing, sector-shaped plates 30; and two beams 31 connecting facing plates 30. The outer face of each plate 30 is fitted with rollers 32 configured to engage guide 27 (FIG. 6); and a pinion 33 operated by respective actuator 29 and configured to engage rack 28 (FIG. 6) to move carriage 16 along the annular path about pipeline P (FIG. 5). Carriage 16, in fact, serves to support and move plastifying and extrusion assembly 17 and rolling assembly 18 about pipeline P (FIG. 5).

Figure 9:
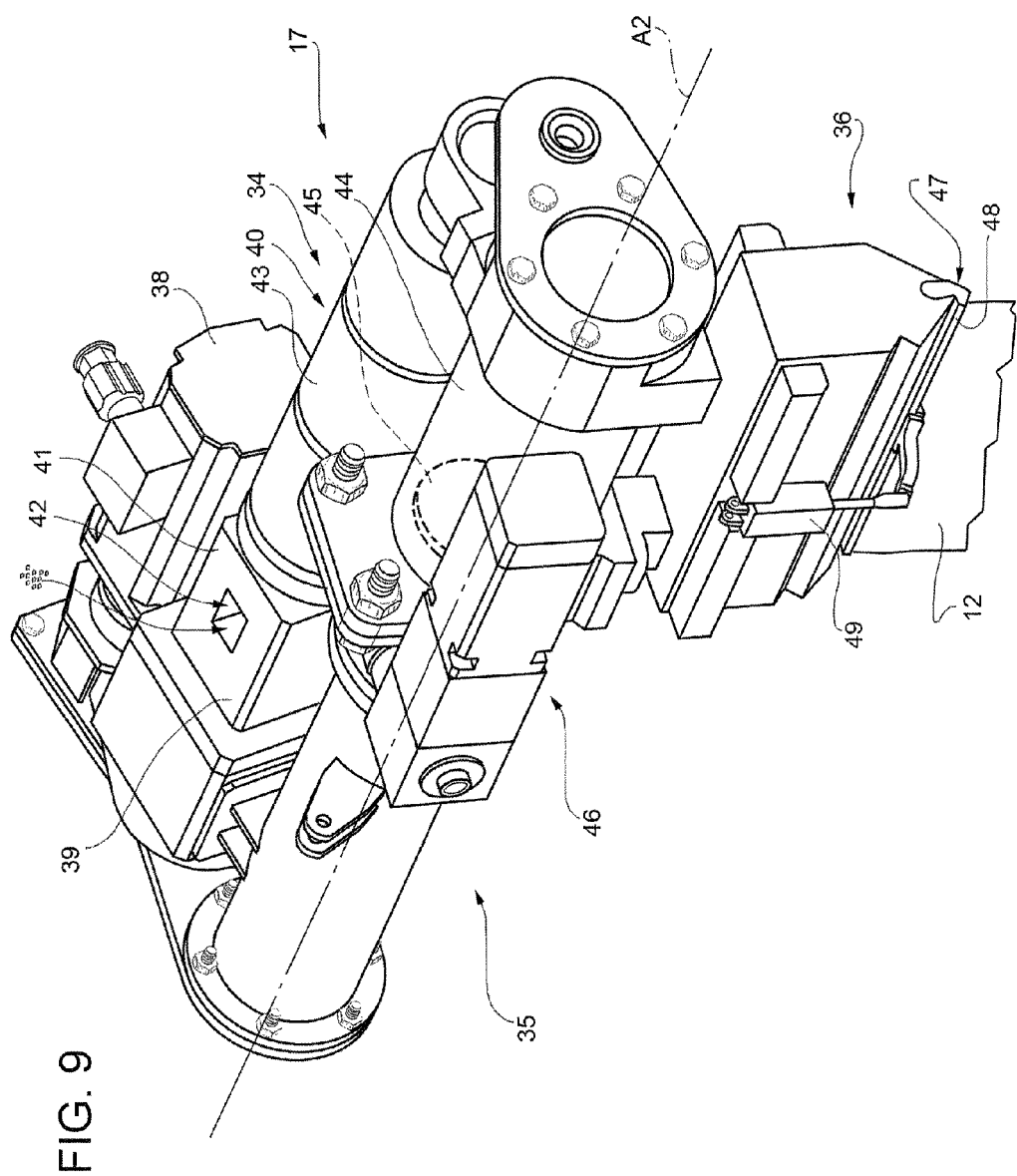
FIG. 9 shows a view in perspective, with parts removed for clarity, of a detail of the device.

As shown in FIG. 9, plastifying and extrusion assembly 17 comprises a plastifying device 34, a storage tank 35, and an extrusion head 36, which, in one embodiment of the disclosure, form a single rigid block mounted on carriage 16, between plates 30, to rotate about an axis A2 parallel to longitudinal axis A1 (FIG. 7), to adjust the position of extrusion head 36 with respect to pipeline P (FIG. 5). For this purpose, as shown in FIG. 7, plastifying and extrusion assembly 17 is connected to carriage 16 by an actuator 37 configured to accurately adjust the position of plastifying and extrusion assembly 17 about axis A2.

As shown in FIG. 9, plastifying device 34 is a screw type driven by a motor 38 and reducer 39, and comprises a cylinder 40, in turn comprising a portion 43, and a portion 41 with a feed port 42. Portion 41 is, in at least one embodiment, cooled by a water circuit, and portion 43 is, in at least one embodiment, heated by electric resistors. Cylinder 40 is connected by a U-fitting to storage tank 35, which comprises a chamber 44, such as a cylinder, in which a piston 45 is operated, in at least one embodiment, by a electromagnetic drive 46 to alter the volume of storage tank 35. In one embodiment, the rod (not shown) of piston 45 is defined by a screw operated by a helical gear (not shown).

To reduce its size and weight, plastifying device 34 is configured to supply a maximum amount of soft polymer material smaller than the maximum capacity of extrusion head 36.

Extrusion head 36 comprises a slit-shaped extrusion port 47 configured to form protective sheeting 12 of the required width and thickness, and is connected directly to storage tank 35. Plastifying and extrusion assembly 17 also comprises a blade 48 fitted to extrusion port 47 of extrusion head 36 to selectively cut the extruded protective sheeting 12, and which is operated by an actuator 49 fitted to extrusion head 36, and also serves to close extrusion port 47 to prevent the soft polymer material from dripping.

As shown in FIGS. 7 and 8, rolling assembly 18 is fitted to carriage 16, and comprises a roller 50; a supporting structure 51 fitted adjustably to carriage 16; an articulated link 52, in particular an articulated quadrilateral, connecting roller 50 to supporting structure 51; and an actuator 53 between articulated link 52 and supporting structure 51. Supporting structure 51 provides for accurately adjusting the position of the whole of rolling assembly 18 with respect to carriage 16.

As shown in FIG. 8, rolling assembly 18 comprises an actuator 54 fitted to the articulated link; and a transmission 55 configured to connect actuator 54 to roller 50, and rotate roller 50 at selectively adjustable speeds and in opposite directions. Roller 50 is made of rigid material, such as metal, and has a contoured profile substantially defined by a central portion 56 configured to contact cutback 8, and by two smaller-diameter lateral portions 57 configured to contact protective sheeting 12 at coating 3. Roller 50 has a contoured groove 58 formed in central portion 56 to adapt the roller to the shape of annular weld bead 7 (FIG. 3).

As shown in FIG. 5, hopper 19 is located over device 14, and is connectable selectively to feed port 42 to feed the solid, such as granular, polymer material to plastifying device 34 when carriage 16 is in a rest position over pipeline P.

Figure 10:
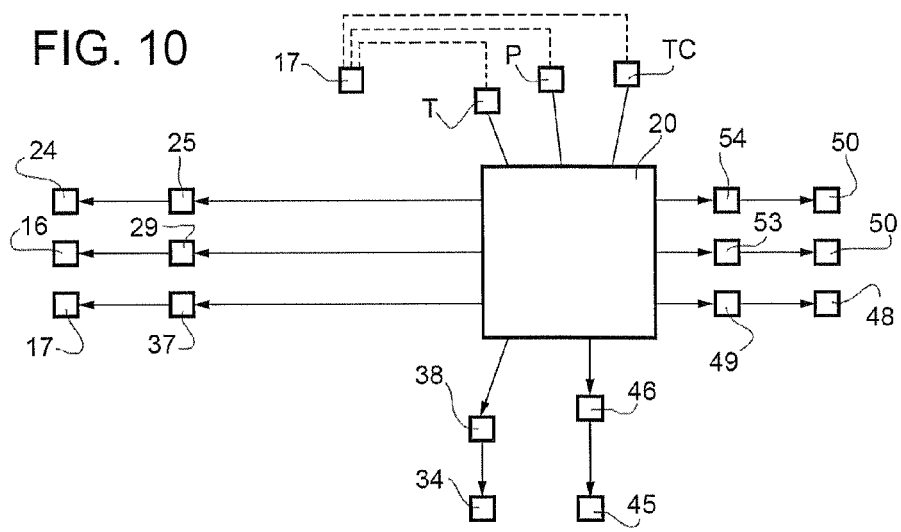
FIG. 10 shows a schematic of the control system of the FIG. 5 device.

As shown in FIG. 10, control unit 20 is connected to actuators 25 to selectively open and close sectors 24; to actuators 29 to move carriage 16 along the annular path; to actuator 37 to adjust the tilt of plastifying and extrusion assembly 17; to motor 38 configured to drive plastifying device 38; to drive 46 of piston 45; to actuator 49 of blade 48; to actuator 53 configured to adjust the position of roller 50; and to actuator 54 configured to rotate roller 50.

Control unit 20 is also connected to thermocouples TC fitted to the whole of plastifying and extrusion assembly 17 to keep the soft polymer material at the temperatures required to plastify and feed the polymer material to extrusion port 47; and to temperature sensors T and pressure sensors P fitted to plastifying and extrusion assembly 17 to determine the condition of the soft polymer material and adjust thermocouples TC accordingly.

As shown in FIG. 5, carriage 16 is connected to a cable bundle 59, which comprises signal cables, power cables, compressed-air feed pipes, and cooling circuit pipes configured to cool feed port 42.

With reference to FIG. 5, in actual use, pipeline P, when released from device 14, moves one step forward with respect to device 14 in direction D1 parallel to longitudinal axis A1. At this stage, carriage 16 is in the rest position over pipeline P, and the hopper feeds the polymer material to plastifying device 34, which plastifies and feeds the polymer material to storage tank 35. Moving pipeline P forward takes much longer than to extrude and apply protective sheeting 12, so the time allotted to plastify the polymer material is long enough to employ a relatively small plastifying device 34 to plastify enough polymer material for protective sheeting 12. Next, device 14 is clamped to pipeline P, with extrusion head 36 positioned over cutback 8 (FIG. 2).

Figure 11:
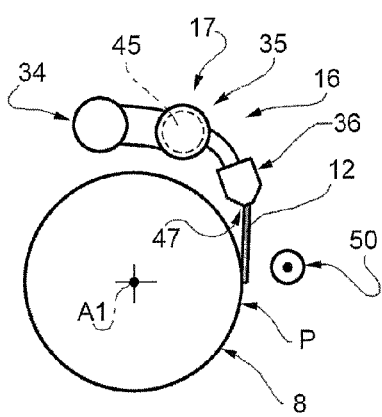
FIGS. 11, 12, 13 and 14 show schematics, with parts removed for clarity, of an operating sequence of the FIG. 5 device.
Figure 12:
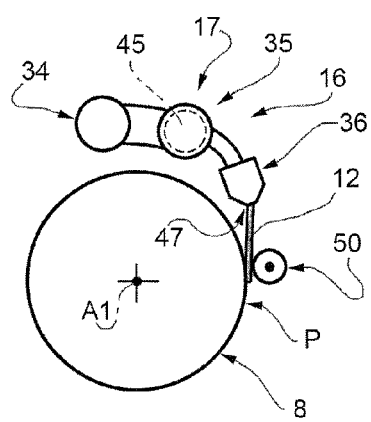

With reference to FIG. 11, in the rest position, extrusion port 47 is located to one side, in an upper quadrant of the annular path, and roller 50 is located a given or designated distance from pipeline P. At the initial extrusion stage, carriage 16 (i.e., extrusion head 36), is maintained stationary in the rest position, and a first portion of protective sheeting 12 is extruded and drops freely by gravity into a position between pipeline P and roller 50. With reference to FIG. 12, when the first portion of protective sheeting 12 is located between pipeline P and roller 50, roller 50 is activated to press the protective sheeting against pipeline P. At this point, carriage 16 (i.e., extrusion head 36), can start moving along the annular path, so infeed of the solid polymer material is cut off, and plastification continues as long as there is polymer material inside plastifying device 34.

Figure 13:
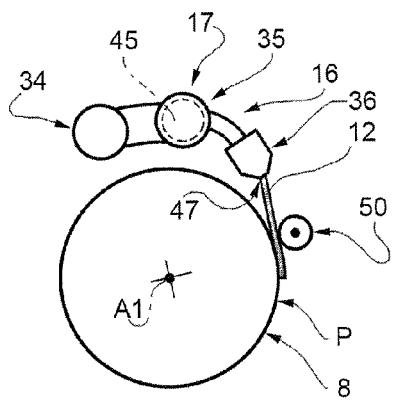

With reference to FIG. 13, as carriage 16 moves forward, extrusion of protective sheeting 12 continues by gradually expelling the soft polymer material from storage tank 35 through extrusion head 36 and extrusion port 47. Roller 50 is moved in time with carriage 16, so as to roll over and press protective sheeting 12 onto pipeline P without generating shear stress in protective sheeting 12, which is still soft when applied. The speed of piston 45 is also synchronized with the speed of carriage 16 to form protective sheeting 12 of constant thickness. At this stage, the protective sheeting 12 being extruded is kept substantially taut between the extrusion port and the grip point between roller 50 and pipeline P, so that protective sheeting 12 is pressed firmly onto pipeline P to prevent air being trapped between the pipeline and protective sheeting 12, and which would be hard to expel once protective sheeting 12 is applied.

Particularly effective is adjusting the travelling speed of carriage 16, and therefore the speed of piston 45 and the rolling speed of roller 50, as a function of the position of carriage 16. In fact, the speed with which protective sheeting 12 is applied is affected by two factors connected with the position of carriage 16 and therefore of protective sheeting 12 itself: the force of gravity on protective sheeting 12 issuing from extrusion port 47; and the fragile nature of the soft protective sheeting 12. The position of extrusion port 47 with respect to pipeline P therefore affects the form of protective sheeting 12, and carriage 16 must be accelerated or decelerated at given or designated points along the annular path. This variation in speed may conveniently be programmed, for example, by dividing the path into sectors and assigning each a given or designated travelling speed.

For the same reasons, and to prevent protective sheeting 12 from contacting pipeline P downstream from the grip point by roller 50, the distance between extrusion port 47 and pipeline P when applying protective sheeting 12 is conveniently adjusted as a function of the position of carriage 16.

Given the width of protective sheeting 12, one turn of carriage 16 about pipeline P is enough to restore first coating 3 (FIG. 3). In actual fact, carriage 16 travels over 360° to enable roller 50 to compress and possibly overlap the opposite ends of protective sheeting 12 as shown in FIG. 14.

Figure 14:
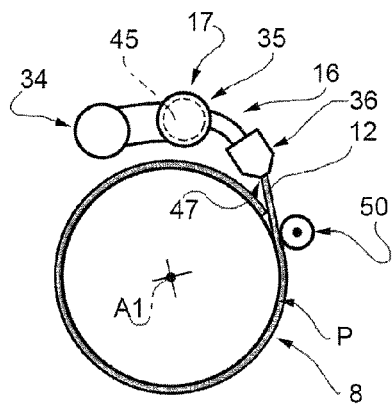

With reference to FIG. 14, once extruded, protective sheeting 12 is cut by blade 48, which closes extrusion port 47 to prevent the soft polymer material from dripping.

At this point, carriage 16 is returned to the initial rest position (FIG. 11), travelling along the annular path in the opposite direction (clockwise in FIG. 14) to that travelled when applying protective sheeting 12. At this stage, roller 50 is kept pressed against protective sheeting 12 and rolled in the opposite direction.

When carriage 16 reaches the initial rest position, device 14 is released from pipeline P to enable carriage to move freely with respect to device 14; and plastifying and extrusion assembly 17 is ready to start the next cycle.

Clearly, changes may be made to the preferred embodiment described of the present disclosure without, however, departing from the protective scope of the accompanying Claims. That is, various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A polymer material protective sheeting application device comprising:
   a carriage configured to move along an annular path extending about a longitudinal axis of a pipeline, said carriage configured to apply a protective sheeting to a cutback on a pipeline;
   a frame including two facing and spaced apart grippers, each of the grippers having a first sector and two second sectors which are hinged to the first sector about a hinge axis parallel to the longitudinal axis, wherein:
      the first sector and the two second sectors are complementary with one another to define a ring,
      the first sector and the two second sectors are configured to be operated by a plurality of actuators to rotate between a closed position and an open position to grip and release the pipeline, and
      in the closed position, the first sector and the two second sectors of each of the grippers define a circular guide configured to guide the carriage; and
   a plastifying and extrusion assembly including a storage tank, a plastifying device, and an extrusion head with an extrusion port, said plastifying and extrusion assembly mounted on the carriage, wherein:
      said plastifying and extrusion assembly is configured to:
         (i) plastify a polymer material from which the protective sheeting is made, and
         (ii) extrude the protective sheeting on board the carriage,
      said storage tank is configured to store the plastified polymer material on board the carriage, and
      said plastifying device is configured to supply a smaller amount of the polymer material than a capacity amount of the extrusion head.

2. The polymer material protective sheeting application device of claim 1, wherein the plastifying and extrusion assembly is mounted on the carriage and configured to rotate about an axis parallel to the longitudinal axis of the pipeline to remotely adjust a distance between the extrusion port and the cutback.

3. The polymer material protective sheeting application device of claim 2, wherein the plastifying and extrusion assembly includes a blade hinged to the extrusion head and configured to:
   cut the extruded protective sheeting at the extrusion port, and
   close the extrusion port.

4. The polymer material protective sheeting application device of claim 1, further comprising a rolling assembly hinged to the carriage and including a roller configured to press the protective sheeting onto the cutback.

5. The polymer material protective sheeting application device of claim 4, wherein the rolling assembly includes:
   an articulated link, and
   an actuator configured to:
      adjust a pressure exerted by the roller on the protective sheeting and
      adjust a position of the roller with respect to the cutback.

6. The polymer material protective sheeting application device of claim 4, wherein the roller is contoured and includes:
   a central portion,
   two lateral portions smaller in diameter than a diameter of the central portion, and
   a groove formed in the central portion to adapt the roller to a shape of a central weld bead on the cutback.

7. The polymer material protective sheeting application device of claim 4, wherein the roller is powered to rotate about an axis of the roller.

8. The polymer material protective sheeting application device of claim 1, wherein the first sector and the two second sectors each include adjustable spacers facing the pipeline and configured to be positioned contacting the pipeline, wherein said adjustable spacers are adjusted to center the frame on the pipeline.

9. The polymer material protective sheeting application device of claim 1, wherein the carriage includes:
   two facing, sector-shaped plates, and
   two beams connecting the two facing, sector-shaped plates, wherein an outer face of each of the two facing, sector-shaped plates is fitted with a plurality of rollers configured to engage the circular guide.

10. The polymer material protective sheeting application device of claim 9, wherein the first sector and the two second sectors of each of the grippers define a circular rack which cooperates with the carriage to move the carriage in a first direction.

11. The polymer material protective sheeting application device of claim 10, wherein the outer face of each of the two facing, sector-shaped plates is fitted with a plurality of rollers configured to engage the circular guide and a pinion operated by an actuator and configured to engage the circular rack to move the carriage along the annular path.

12. A polymer material protective sheeting application device comprising:
   a carriage configured to move along an annular path extending about a longitudinal axis of a pipeline, said carriage configured to apply a protective sheeting to a cutback on a pipeline;
   a rolling assembly hinged to the carriage and including a roller configured to press the protective sheeting onto the cutback;
   a frame including two facing and spaced apart grippers, each of the grippers having a first sector and two second sectors which are hinged to the first sector about a hinge axis parallel to the longitudinal axis, wherein:
      the first sector and the two second sectors are complementary with one another to define a ring,
      the first sector and the two second sectors are configured to be operated by a plurality of actuators to rotate between a closed position and an open position to grip and release the pipeline,
      the first sector and the two second sectors each include adjustable spacers facing the pipeline and configured to be positioned contacting the pipeline to center the frame on the pipeline, and in the closed position, the first sector and the two second sectors of each of the grippers define a circular guide configured to guide the carriage; and a plastifying and extrusion assembly including a storage tank, a plastifying device, and an extrusion head with an extrusion port, said plastifying and extrusion assembly mounted on the carriage, wherein:

said plastifying and extrusion assembly is configured to:
  (i) plastify a polymer material from which the protective sheeting is made,
  (ii) extrude the protective sheeting on board the carriage, and
  (iii) rotate about an axis parallel to the longitudinal axis of the pipeline to remotely adjust a distance between the extrusion port and the cutback, said storage tank is configured to store the plastified polymer material on board the carriage, and said plastifying device is configured to supply a smaller amount of the polymer material than a capacity amount of the extrusion head.

* * * * *